US006976351B2

(12) United States Patent
Catharine et al.

(10) Patent No.: US 6,976,351 B2
(45) Date of Patent: Dec. 20, 2005

(54) METHODS AND APPARATUS FOR MONITORING GAS TURBINE COMBUSTION DYNAMICS

(75) Inventors: Douglas Ancona Catharine, Scotia, NY (US); Eamon Gleeson, Atlanta, GA (US); Soumen De, West Bengal (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/407,407

(22) Filed: Apr. 4, 2003

(65) Prior Publication Data

US 2004/0211187 A1 Oct. 28, 2004

(51) Int. Cl.[7] ............................ F02C 9/00; F02G 3/00
(52) U.S. Cl. .................... 60/39.281; 60/772; 60/39.77
(58) Field of Search .................... 60/772, 779, 39.091, 60/39.22, 39.24, 724, 793, 39.77, 39.78, 60/39.21, 725, 39.281, 737; 181/213, 229; 431/114

(56) References Cited

U.S. PATENT DOCUMENTS 4,058,975 A * 11/1977 Gilbert et al. ........... 60/39.281
4,455,820 A * 6/1984 Buckley et al. ............... 60/773
4,557,106 A 12/1985 Williams et al.
5,365,732 A 11/1994 Correa
5,394,689 A * 3/1995 D'Onofrio ................... 60/204
5,465,570 A * 11/1995 Szillat et al. ................ 60/776
5,487,266 A * 1/1996 Brown ........................ 60/776
5,544,478 A * 8/1996 Shu et al. ..................... 60/773
5,575,144 A 11/1996 Brough
5,706,643 A 1/1998 Snyder et al.
5,797,266 A 8/1998 Brocard et al.
5,809,769 A * 9/1998 Richards et al. .............. 60/776
6,205,765 B1 * 3/2001 Iasillo et al. .................. 60/773
6,312,154 B1 11/2001 Schick et al.
6,354,071 B2 3/2002 Tegel et al.
6,543,234 B2 * 4/2003 Anand et al. ................. 60/772
6,560,967 B1 * 5/2003 Cohen et al. ................. 60/776
6,742,341 B2 * 6/2004 Ryan et al. ................... 60/773
2003/0051479 A1 * 3/2003 Hogle et al. .................. 60/772

* cited by examiner

*Primary Examiner*—William H. Rodriguez
(74) *Attorney, Agent, or Firm*—Armstrong Teasdale LLP

(57) ABSTRACT

A method for monitoring and diagnosing the combustion dynamics of a gas turbine engine system includes mounting at least one sensor on an external surface of at least one combustor can, receiving a signal from the sensor mounted to the combustor can, validating an accuracy of the signal from the sensors, determining the combustion dynamics of the can based on the received signals, and generating an indication when a combustion dynamic threshold has been exceeded.

18 Claims, 4 Drawing Sheets

METHODS AND APPARATUS FOR MONITORING GAS TURBINE COMBUSTION DYNAMICS

BACKGROUND OF THE INVENTION

This invention relates generally to gas turbine engines, and more particularly, to methods and apparatus for monitoring gas turbine engines.

Gas turbine engines typically include a compressor section, a combustor section, and at least one turbine section. The compressor compresses air which is mixed with fuel and channeled to the combustor. The mixture is then ignited generating hot combustion gases. The combustion gases are channeled to the turbine which extracts energy from the combustion gases for powering the compressor, as well as producing useful work to power a load, such as an electrical generator, or to propel an aircraft in flight.

Gas turbine engines operate in many different operating conditions, and stable combustion facilitates engine operation over a wide range of engine operating conditions. More specifically, stable combustion facilitates reducing engine blowout while achieving engine rated thrust or power levels. Furthermore, for gas turbines operated with dry low nitrous oxide (DLN) techniques, combustion stability also facilitates controlling nitrous oxide (NOx) and carbon monoxide emissions. While using DLN techniques facilitates generating a reduced quantity of NOx, the lean fuel/air mixture supplied to the gas turbine may also cause combustion instabilities, such as oscillations, which may result in mechanical failures and/or shutdowns. Relatively high oscillation frequencies may cause combustor fatigue thereby reducing the service life of the combustor, or may also cause other hot gas path components to fail.

To facilitate reducing potentially harmful combustion resonance, frequent inspections of the gas turbine are performed to determine whether the combustion dynamics have reached a level where component damage is more probable. For example, temporary transducers can be attached to the combustor to enable dynamic measurements to be made during tuning. However, once the transducers are removed, direct combustion dynamics information is not available to the operator until the next scheduled tuning.

BRIEF DESCRIPTION OF THE INVENTION

In one aspect, a method for monitoring and diagnosing the combustion dynamics of a gas turbine engine system is provided. The method includes mounting at least one sensor on an external surface of at least one combustor can, receiving a signal from the sensor mounted to the combustor can, validating an accuracy of the signal from the sensors, determining the combustion dynamics of the can based on the received signals, and generating an indication when a combustion dynamic threshold has been exceeded.

In another aspect, a method for monitoring and diagnosing the combustion dynamics of a gas turbine engine system that includes at least one gas turbine that includes a plurality of combustor cans is provided. The method includes mounting at least one sensor on an external surface of at least combustor can, receiving a signal from the sensor mounted to the combustor can, determining a combined index that includes a can number at which a thermo acoustic oscillation of the received signal has exceeded a predefined limit, determining a maximum, a minimum, and an average pressure level in the can, using the combined index, the maximum pressure level, the minimum pressure level, and the average pressure level to generate a value indicative of the combustion dynamics of a gas turbine engine system, and activating an alarm when the value exceeds a predefined setpoint.

In a further aspect, a gas turbine system is provided. The gas turbine system includes a gas turbine including a plurality of combustor cans, at least one pressure sensor electrically coupled to at least one combustor can, the sensor configured to transmit a signal, and at least one DAS configured to receive the signal from the pressure sensor. The DAS executes an algorithm to validate an accuracy of the sensors, to determine the combustion dynamics of each can based on the sensor signal, and to generate an indication of a can number when a combustion dynamic threshold in the can has been exceeded.

DETAILED DESCRIPTION OF THE INVENTION

While the methods and apparatus are herein described in the context of a gas turbine engine used in an industrial environment, it is contemplated that the herein described method and apparatus may find utility in other combustion turbine systems applications including, but not limited to, turbines installed in aircraft. In addition, the principles and teachings set forth herein are applicable to gas turbine engines using a variety of combustible fuels such as, but not limited to, natural gas, gasoline, kerosene, diesel fuel, and jet fuel. The description hereinbelow is therefore set forth only by way of illustration rather than limitation.

Figure 1:
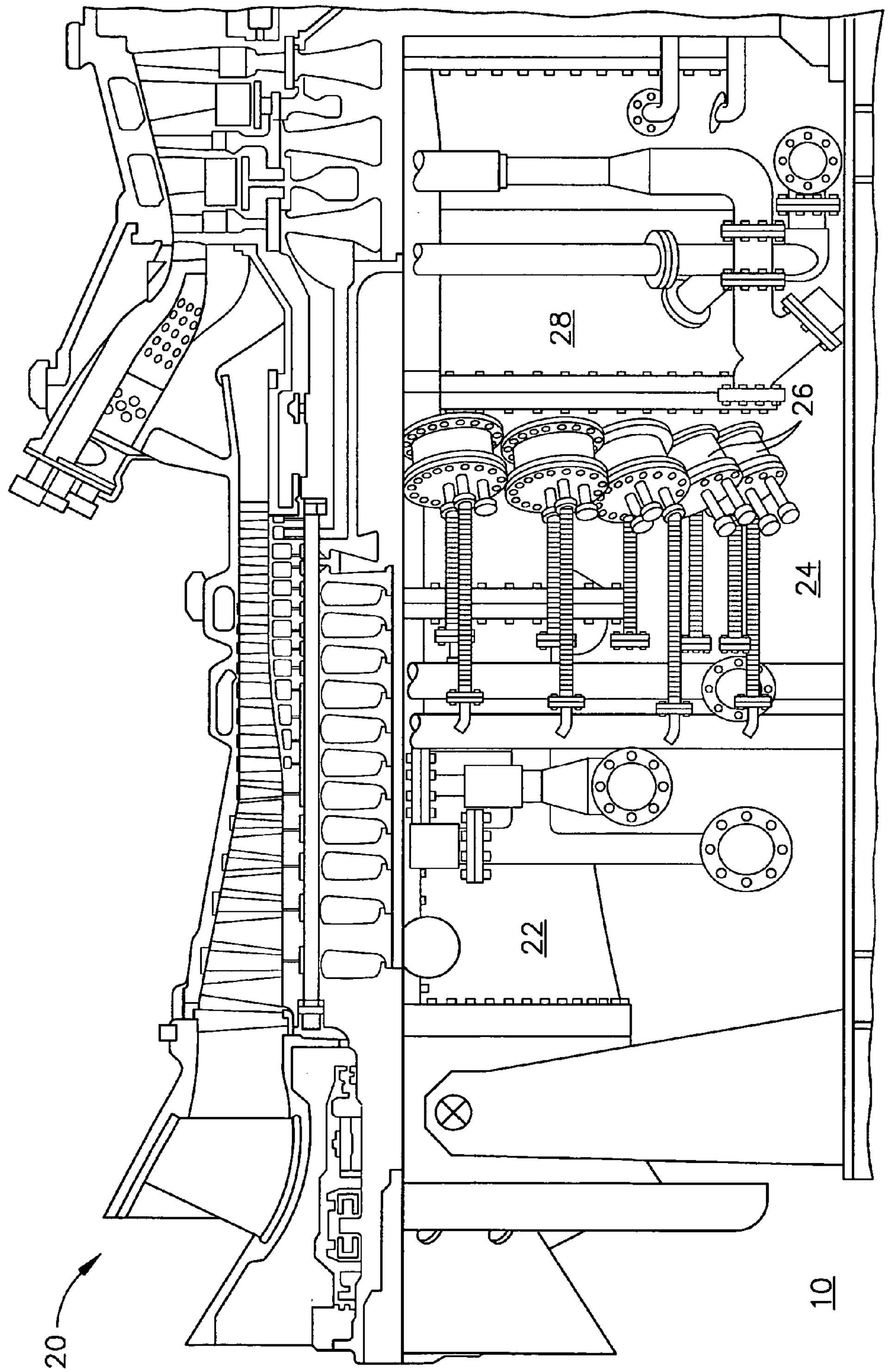
FIG. 1 is a side cutaway view of a gas turbine system that includes a gas turbine.

FIG. 1 is a side cutaway view of a gas turbine system 10 that includes a gas turbine 20. Gas turbine 20 includes a compressor section 22, a combustor section 24 including a plurality of combustor cans 26, and a turbine section 28 coupled to compressor section 22 using a shaft (not shown).

In operation, ambient air is channeled into compressor section 22 where the ambient air is compressed to a pressure greater than the ambient air. The compressed air is then channeled into combustor section 24 where the compressed air and a fuel are combined to produce a relatively high-pressure, high-velocity gas. Turbine section 28 extracts energy from the high-pressure, high-velocity gas discharged from combustor section 24. The combusted fuel mixture is used to produce energy, such as, for example, electrical, heat, and/or mechanical energy. In one embodiment, the combusted fuel mixture produces electrical energy measured in kilowatt hours (kWh). However, the present invention is not limited to the production of electrical energy and encompasses other forms of energy, such as, mechanical work and heat. Gas turbine system 10 is typically controlled, via various control parameters, from an automated and/or electronic control system (not shown) that is attached to gas turbine system 10.

Figure 2:
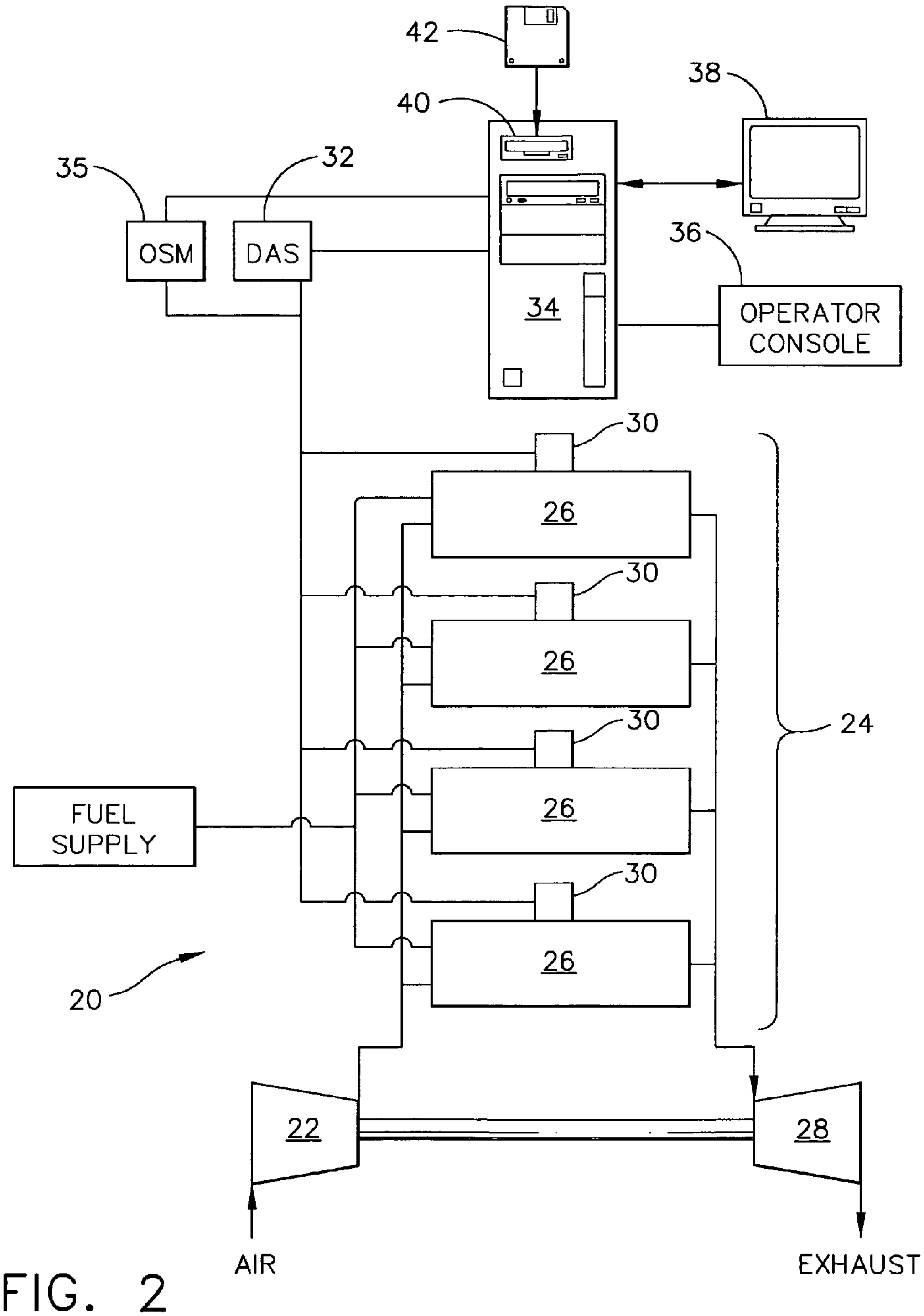
FIG. 2 is a schematic illustration the gas turbine system shown in FIG. 1.

FIG. 2 is a simplified schematic illustration of gas turbine system 10 shown in FIG. 1. Gas turbine system 10 also includes a plurality of sensors 30 electrically coupled to gas turbine 20. A data acquisition system (DAS) 32 samples analog data from sensors 30 and converts the analog data to digital signals for subsequent processing. A computer 34 receives the sampled and digitized sensor data from at least one of DAS 32 and an onboard system monitor (OSM) 35, and performs high-speed data analysis. Although only four combustor cans 26 are shown, it should be realized that gas turbine engine 20 can include more or less than four combustor cans 26, for example, in one exemplary embodiment, gas turbine engine 20 includes twenty four combustor cans 26.

Computer 34 receives commands from an operator via a keyboard 36. An associated monitor 38 such as, but not limited to, a liquid crystal display (LCD) and a cathode ray tube, allows the operator to observe data received from computer 34. The operator supplied commands and parameters are used by computer 34 to provide control signals and information to DAS 32 and OSM 35.

In one embodiment, computer 34 includes a device 40, for example, a floppy disk drive, CD-ROM drive, DVD drive, magnetic optical disk (MOD) device, or any other digital device including a network connecting device such as an Ethernet device for reading instructions and/or data from a computer-readable medium 42, such as a floppy disk, a CD-ROM, a DVD or an other digital source such as a network or the Internet, as well as yet to be developed digital means. In another embodiment, computer 34 executes instructions stored in firmware (not shown). Computer 34 is programmed to perform functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein. Additionally, although the herein described methods and apparatus are described in an industrial setting, it is contemplated that the benefits of the invention accrue to non-industrial systems such as those systems typically employed in a transportation setting such as, for example, but not limited to, aircraft.

Figure 3:
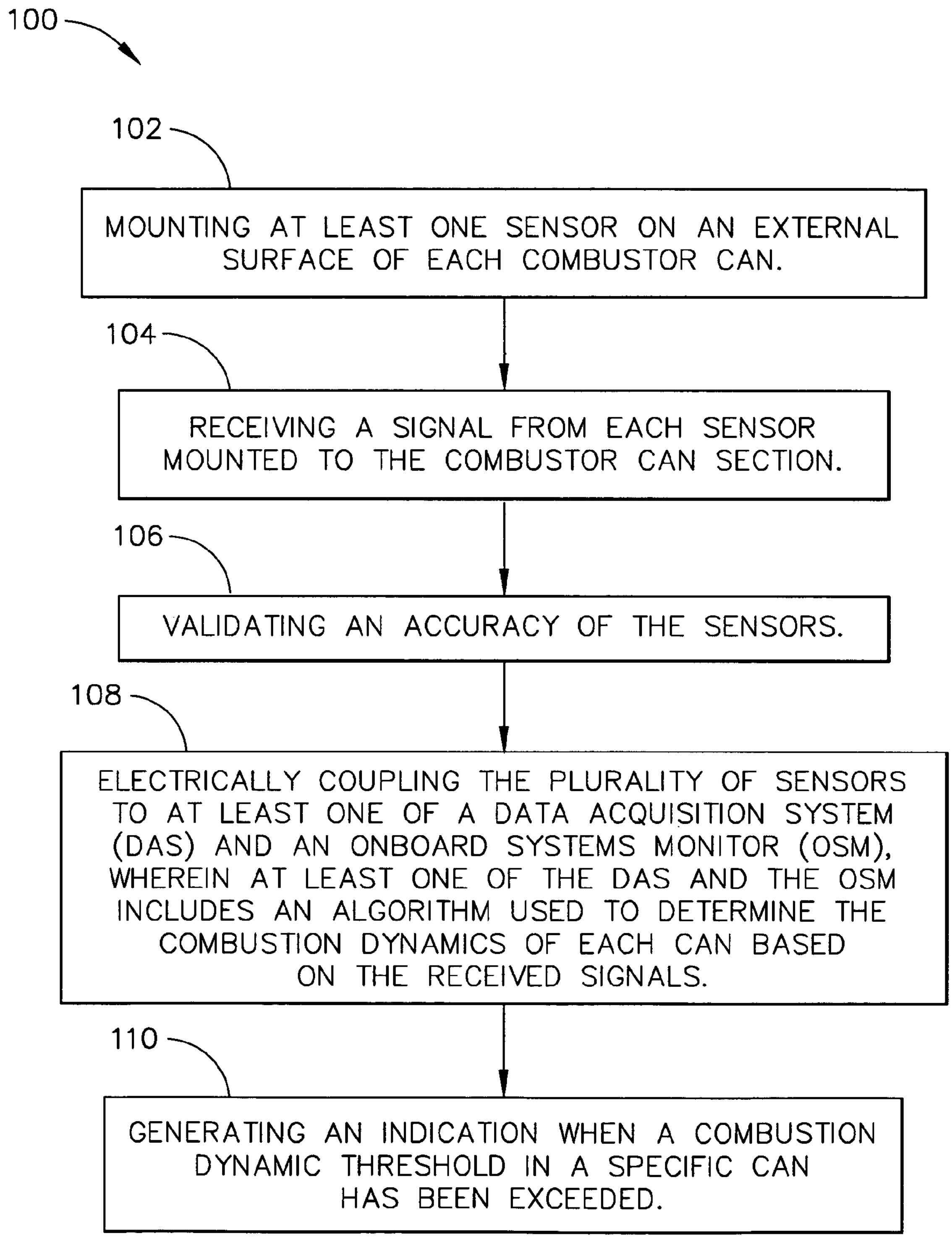
FIG. 3 is an exemplary method for monitoring the combustion dynamics of a gas turbine engine system.
Figure 4:
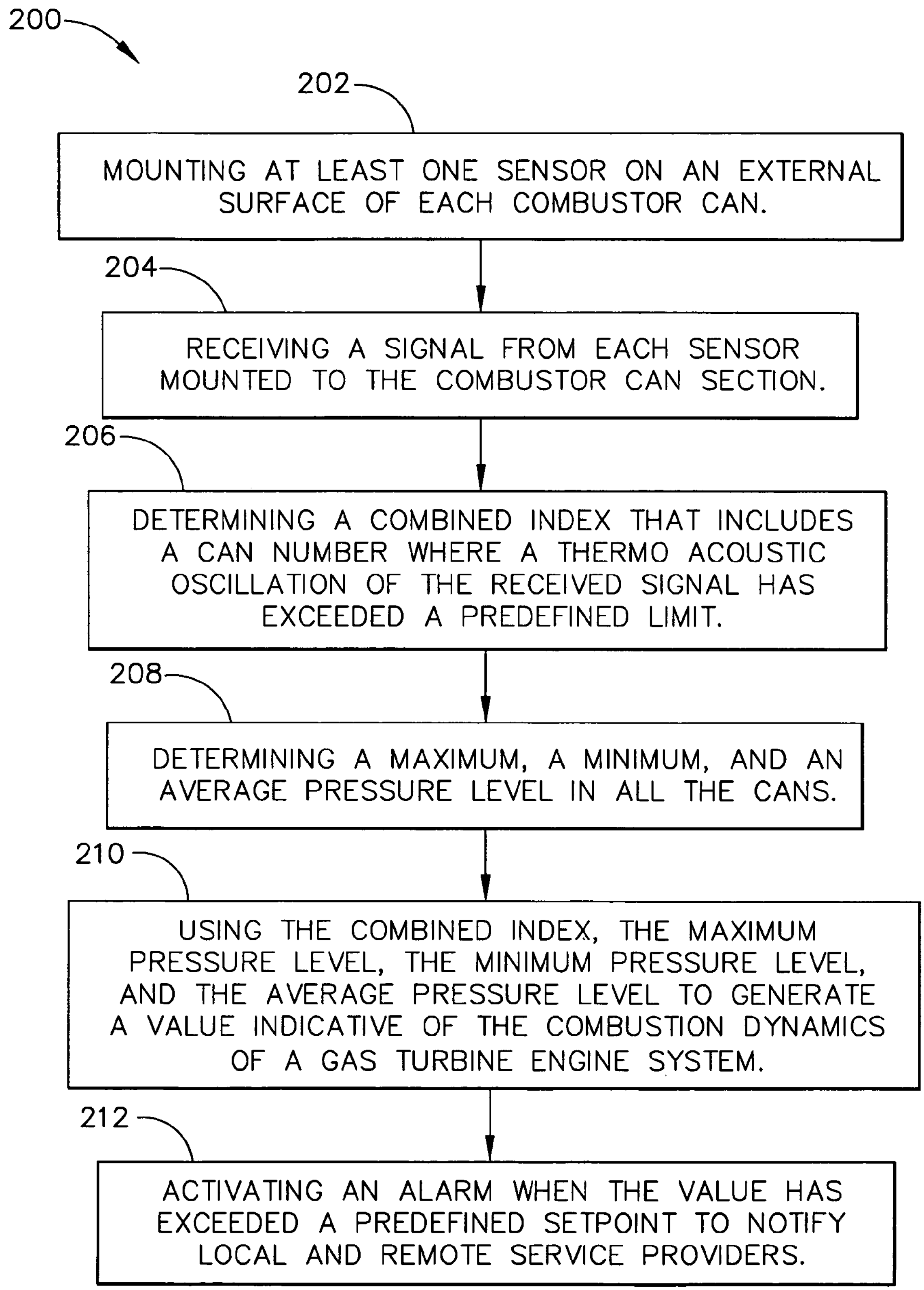
FIG. 4 is an exemplary method for monitoring the combustion dynamics of a gas turbine engine system.

FIG. 3 is a flow chart illustrating an exemplary method 100 for monitoring and diagnosing the combustion dynamics of a gas turbine engine system, such as system 10 (shown in FIG. 1), wherein the system includes at least one gas turbine that includes a plurality of combustor cans. In the exemplary embodiment, method 100 includes mounting 102 at least one sensor on an external surface of each combustor can, receiving 104 a signal from each sensor mounted to the combustor can surface, and validating 106 the operation and accuracy of the sensors. Method 100 also includes electrically coupling 108 the plurality of sensors to at least one of DAS 32 and OSM 35, wherein at least one of DAS 32 and OSM 35 includes an algorithm to determine the combustion dynamics of each can based on the received sensor signals, and generating 110 an indication when a combustion dynamic threshold in a specific can has been exceeded. The algorithm facilitates determining the combustion dynamics of gas turbine 20 which are then used to conduct remote analysis and remote diagnostics of gas turbine 20.

In use, signals representative of combustor can pressures, i.e. thermo-acoustic oscillation information generated during to the combustion, are collected from sensors 30. Additionally, various other gas turbine operational data is received at DAS 32. DAS 32 executes a Fast Fourier Transformation (FFT) on the received data to extract frequency component signals from the data. In the exemplary embodiment, DAS 32 extracts six frequency component signals from each sensor 30. DAS 32 then computes a maximum amplitude and a frequency at the maximum amplitude for each extracted signal in three frequency bands including a low frequency band, a medium frequency band, and a high frequency band. The thermo-acoustics oscillation information and various other gas turbine operational data are used to monitor and diagnose the combustion dynamics of gas turbine 20.

The signals received at DAS 32 are validated prior to being used to compute the combustion dynamics of gas turbine 20. In the exemplary embodiment, the sensor validation criterion varies with the sensor used, i.e. different sensors are used for different process parameters. For example, for at least some sensors other than sensors 30, such as, but not limited to, turbine inlet temperature, turbine exhaust temperature, and fuel pressure, the validation criterion includes performing a range check.

When the signals from sensors 30 are validated, a range of each sensor 30 is verified using computer 34. During operation, when a sensor value exceeds an upper limit, or is operating below a predetermined lower limit, the sensor value is considered to be invalid. Sensors 30 are then checked for their standard deviation. If the standard deviation of sensors 30 is zero for approximately ten minutes, then the sensor values are considered invalid. In the exemplary embodiment, information is transmitted from sensors 30, and sensors other than sensors 30, to both DAS 32 and OSM 35. In one embodiment, if DAS 32 is incapable of performing signal processing, either due to a faulty DAS 32 or a faulty sensor, the sensors are considered invalid, and the signal validation is performed using OSM 35. OSM 35 then validates the signals by determining the rate at which the signals are updated. In the exemplary embodiment, if the sensor information is not updated for more than approximately ten minutes, the corresponding sensor is considered to be invalid. If the sensor resumes transmission for at least approximately ten minutes, i.e. a sensor update is received at OSM 35 for at least approximately ten minutes, the sensor data is considered valid and the sensor signal is used the perform the herein described calculations.

Once valid data is received at either OSM 35 or DAS 32, the validated data is used to determine the amplitude of the combustor thermo acoustics under predefined operating conditions. In the exemplary embodiment, at least two levels of amplitude are determined using at least one of a failure modes and effects analysis (FMEA), an engineering data analysis, and empirical evidence. The first alert, also referred to herein as a yellow level, indicates that the dynamic pressures in turbine 20 are higher then optimum and that it may be cost-effective to re-tune the combustor. The second alert, also referred to herein as a red level, indicates that dynamic pressures in turbine 20 have reached a point where there is a high confidence, or probability, that continued operation of turbine 20, may cause component degradation over a relatively short period of time.

In the exemplary embodiment, the thermo acoustic amplitude levels of turbine 20 are monitored while gas turbine 20 is operating in a substantially steady state condition. In another exemplary embodiment, the thermo acoustic amplitude levels of turbine 20 are monitored while gas turbine 20 is operating in a substantially non-steady state condition. A predefined quantity of data points, i.e. amplitude levels, at a predefined sampling interval are then monitored while gas turbine 20 is operating in at least one of the steady state condition or the non-steady state condition. In one embodiment, approximately thirty-two data points are sampled at a sampling rate of approximately two seconds between samples to determine the acoustic amplitude levels of turbine 20.

Steady state operation as used herein defines an operating condition wherein a plurality of the observed points received from gas turbine 20 occur at a substantially constant frequency. The points are considered to have a substantially constant frequency when the frequency of the points deviates by no more than a pre-specified bandwidth, such as, but not limited to, ±/−12.5 Hz. Non-steady state operation as used herein defines an operating condition wherein a plurality of the observed points received from gas turbine 20 do not occur at a substantially constant frequency.

Additionally, any data points received during a substantial change in gas turbine system 10 output will not be used to determine the thermo acoustic amplitude levels of turbine 20. Further, data points received during a relatively fast change in wattage (DWATT) output from system 10 are not be used to determine the thermo acoustic amplitude levels of turbine 20. For example, once a DWATT change is detected, the data collected during the DWATT event and for approximately the next four minutes will not be used to determine the thermo acoustics amplitude levels of turbine 20. A fast DWATT change, as used herein, occurs whenever an average DWATT observed in the preceding ten minutes exceeds the DWATT observed in the preceding 1/10 of a second by approximately twenty-five megawatts (MW).

Additionally, any data points observed within one minute after a combustion mode change is observed are not used to determine the thermo acoustics amplitude levels of turbine 20. As used herein, a combustion mode change occurs under the following conditions, when any of the fuel nozzle burners transitions from an ON state to an OFF state, or transitions from an OFF state to an ON state, when gas turbine 20 transitions from a gas fuel mode to a liquid fuel mode, or from a liquid fuel mode to a gas fuel mode, or during an On-line Water Wash mode or four minutes thereafter.

In the exemplary embodiment, data points collected during turbine-fired conditions are used by the algorithm to determine the thermo acoustic amplitude levels of turbine 20. The gas turbine is in turbine-fired conditions when a percentage speed of a main shaft is above approximately ten percent of a synchronous speed, the gas turbine exhaust air temperature is greater than approximately 2000° F., and combustor 24 has a steady flame. Steady flame condition as used herein occurs when a digital flame sensor (not shown) transmits a signal to either DAS 32 or OSM 35 indicating an active flame in 60% of the samples for at least one preceding minute.

After the sensor signals have been validated and the steady state conditions have been determined, the thermo acoustic signals are checked to determine their amplitude levels. In one embodiment, if the signals exceed at least one of the yellow threshold or the red threshold an alarm is activated. If the amplitude levels decrease below at least one of the yellow threshold or the red threshold for less than approximately one hour, the alarms remain activated. If the amplitude levels decrease below at least one of the yellow threshold or the red threshold for greater than approximately one hour, the alarms are deactivated. Activating and deactivating the alarms using the methods described herein facilitates substantially reducing alarm signals occurring in a particular combustor can. In the exemplary embodiment, an individual combustor can 26 or all combustor cans 26 are configured to activate the alarm during an alarm condition. The generated alarms are coded into a bit map index wherein the bit location in the bit index indicates the can number in which the alarm is activated. Separate bit indexes are created for the red and yellow alarm. Whenever the alarm index has a new bit set, a new alarm message is sent out for remote notification.

In another exemplary embodiment, a method 200 for monitoring and diagnosing the combustion dynamics of a gas turbine engine system includes mounting 202 at least one sensor on an external surface of each combustor can, receiving 204 a signal from each sensor mounted to the combustor can section, and determining 206 a combined index that includes a can number where a thermo acoustic oscillation of the received signal has exceeded a predefined limit. Method 200 also includes determining 208 a maximum, a minimum, and an average pressure level in all the cans, using 210 the combined index, the maximum pressure level, the minimum pressure level, and the average pressure level to generate a value indicative of the combustion dynamics of a gas turbine engine system, and activating 212 an alarm when the value has exceeded a predefined setpoint to notify local and remote service providers.

The above-described methods and apparatus provide a cost-effective and reliable means for monitoring and diagnosing combustion dynamics of a gas turbine engine. More specifically, the methods facilitate determining a combined index that includes a can number when a thermo-acoustic oscillation in the can has exceeded a predefined setpoint. The apparatus also facilitates monitoring the pressure levels inside the combustor can using a transducer, determining the maximum, minimum and average pressure levels in a plurality of combustor cans, and using the information collected from transducers to generate a value that will actuate an alarm when the value has been exceeded.

An exemplary method and apparatus for monitoring and diagnosing combustion dynamics of a gas turbine engine are described above in detail. The apparatus illustrated is not limited to the specific embodiments described herein, but rather, components of each may be utilized independently and separately from other components described herein. For example, the computer algorithm can also be used in combination with a variety of other turbine engines.

While the invention has been described in terms of various specific embodiments, those skilled in the art will recognize that the invention can be practiced with modification within the spirit and scope of the claims.

What is claimed is:

1. A method for monitoring and diagnosing the combustion dynamics of a gas turbine engine system, said system comprising at least one gas turbine comprising a plurality of combustor cans, said method comprising:

- mounting at least one sensor on an external surface of at least one of the plurality of combustor cans;
- receiving a signal from at least one sensor mounted to at least one of the plurality of combustor cans;
- validating an accuracy of the signal from at least one sensor, wherein said validating an accuracy of at least one sensor comprises:
  - verifying at least one of a dynamic range and a static range of at least one sensor; and
  - determining a standard deviation of at least one sensor;
- determining the combustion dynamics of at least one of the plurality of combustor cans based on the received signals; and
- generating an indication when a combustion dynamic threshold has been exceeded.

2. A method in accordance with claim 1 wherein said mounting at least one sensor on an external surface of at least one of the plurality of combustor cans comprises mounting at least one pressure sensor on an external surface of at least one of the plurality of combustor cans.

3. A method in accordance with claim 1 further comprising:

performing a Fast Fourier Transform (FFT) on the signal received at a DAS and an OSM;

extracting a plurality of signals from the FFT;

computing a maximum amplitude of the extracted signals; and computing a frequency of the signal of the maximum amplitude in three frequency bands, wherein the frequency bands are defined as including at least one of a low frequency band, a medium frequency band, and a high frequency band.

4. A method in accordance with claim 1 further comprising determining the combustion dynamics of at least one of the plurality of combustor cans using an OSM when a DAS is incapable of performing signal processing.

5. A method in accordance with claim 1 further comprising determining the combustion dynamics of at least one of the plurality of combustor cans using sensor data received from at least one sensor that have been transmitting for at least ten consecutive minutes.

6. A method in accordance with claim 1 further comprising determining an operational state of the gas turbine engine using only data collected while the engine is operating in a known operating state condition.

7. A method in accordance with claim 6 wherein determining an operational state of the gas turbine engine further comprises operating the gas turbine in a known operating state condition such that a plurality of data points collected occur at a substantially constant frequency.

8. A method in accordance with claim 1 comprising determining at least two dynamic amplitude levels of each sensor signal.

9. A method in accordance with claim 8 further comprising activating an alarm based on at least one amplitude level.

10. A method in accordance with claim 9 further comprising activating a first alarm when a first combustor dynamic pressure is greater than an optimum dynamic pressure, and activating a second alarm when a dynamic pressure is greater than the first combustor dynamic pressure.

11. A method for monitoring and diagnosing the combustion dynamics of a gas turbine engine system, said system comprising at least one gas turbine comprising a plurality of combustor cans, said method comprising:

mounting at least one sensor on an external surface of at least one combustor can;

receiving a signal from at least one sensor mounted to at least one of the plurality of combustor cans;

determining a combined index that includes a can number at which a thermo acoustic oscillation of the received signal has exceeded a predefined limit;

determining a maximum, a minimum, and an average pressure level in at least one of the plurality of combustor cans;

using the combined index, the maximum pressure level, the minimum pressure level, and the average pressure level to generate a value indicative of the combustion dynamics of a gas turbine engine system; and activating an alarm when the value exceeds a predefined setpoint.

12. A method in accordance with claim 11 further comprising:

performing a Fast Fourier Transform (FFT) on the signal received at a DAS and an OSM;

extracting a plurality of signals from the FFT; and computing a maximum amplitude of the extracted signals;

using the maximum amplitude to compute a frequency of the signal in three frequency bands, wherein the frequency bands includes a low frequency band, a medium frequency band, and a high frequency band.

13. A method in accordance with claim 11 further comprising validating at least one sensor, wherein said validating at least one sensor comprises:

determining and verifying a range of at least one sensor; and determining a standard deviation of at least one sensor.

14. A method in accordance with claim 11 further comprising determining the combustion dynamics of at least one of the plurality of combustor cans using sensor data received from at least one sensor that have been transmitting for at least ten consecutive minutes.

15. A method in accordance with claim 11 further comprising determining the combustion dynamics of at least one of the plurality of combustor cans using data collected while the turbine is operating in a steady state condition.

16. A gas turbine system comprising:

a gas turbine comprising a plurality of combustor cans;

at least one pressure sensor electrically coupled to at least one combustor can, at least one sensor configured to transmit a signal; and at least one DAS configured to receive the signal from at least one pressure sensor, said DAS programmed to:

validate an accuracy of the signal from at least one sensor; and determine the combustion dynamics of at least one of the plurality of combustor cans to which at least one sensor is coupled based on the sensor signal; and generate an indication of a can number when a combustion dynamic threshold in at least one of the plurality of combustor cans has been exceeded, wherein said DAS is configured to activate an alarm based on at least one amplitude level of said signal.

17. A gas turbine system in accordance with claim 16 further comprising an onboard system monitor configured to:

determine the combustion dynamics of at least one of the plurality of combustor cans based on the sensor signal; and generate an indication of a can number in which a combustion dynamic threshold in at least one of the plurality of combustor cans has been exceeded.

18. A gas turbine system in accordance with claim 16 wherein said DAS is further configured to activate a first alarm when a first combustor dynamic pressure is greater than an optimum dynamic pressure, and activate a second alarm when a dynamic pressure is greater than the first combustor dynamic pressure.

* * * * *